US005688892A

United States Patent [19]
Ishii et al.

[11] Patent Number: 5,688,892
[45] Date of Patent: Nov. 18, 1997

[54] PROCESS FOR PRODUCING RAPIDLY CURABLE COLD-SETTING POLYURETHANE COATING WATERPROOFER

[75] Inventors: Akira Ishii, Yokohama; Shigeo Katagiri, Matsudo, both of Japan

[73] Assignees: Hodogaya Chemical Co., Ltd.; Hodogaya Construction Products Co., Ltd., both of Kawasaki, Japan

[21] Appl. No.: 549,729

[22] PCT Filed: Apr. 21, 1995

[86] PCT No.: PCT/JP95/00786

§ 371 Date: Nov. 2, 1995

§ 102(e) Date: Nov. 2, 1995

[87] PCT Pub. No.: WO95/29198

PCT Pub. Date: Nov. 2, 1995

[30] Foreign Application Priority Data

Apr. 21, 1994 [JP] Japan .................................. 6-082871
Sep. 19, 1994 [JP] Japan .................................. 6-223140
Apr. 10, 1995 [JP] Japan .................................. 7-084024

[51] Int. Cl.$^6$ .................................................. G08G 18/32
[52] U.S. Cl. ............................ 528/76; 528/55; 528/56; 528/58; 528/64
[58] Field of Search .......................... 528/76, 55, 64, 528/56, 58

[56] References Cited

U.S. PATENT DOCUMENTS

| 3,882,072 | 5/1975 | Olstowski et al. ........................ 528/78 |
| 4,927,901 | 5/1990 | Miyazaki . |
| 4,945,149 | 7/1990 | Matsumoto et al. . |
| 5,049,638 | 9/1991 | Matsumoto et al. . |
| 5,066,761 | 11/1991 | Miyazaki . |

FOREIGN PATENT DOCUMENTS

| 62-57467 | 3/1987 | Japan . |
| 2-189321 | 7/1990 | Japan . |
| 6-271637 | 9/1994 | Japan . |
| 7-26203 | 1/1995 | Japan . |

OTHER PUBLICATIONS

Polyurethane Handbook, ed. Gunter Oertel, Hanser Publishers, pp. 556-559, 1994.

*Primary Examiner*—Ralph H. Dean
*Attorney, Agent, or Firm*—Wenderoth, Lind & Ponack

[57] ABSTRACT

The present invention provides a process for producing a rapidly curable cold-setting polyurethane coating waterproofer which permits the employment of a highly safe aromatic polyamine crosslinker, which is rapidly cured even in the absence of an organometallic catalyst to thereby give a coating film having excellent heat and water resistances, and which can retain a pot life suited for, especially, hand coating. A base composed of an isocyanate-terminated prepolymer comprising the product of reaction between tolylene diisocyanate and a polyoxypropylene polyol and/or a polyoxyethylenepropylene polyol is in-situ mixed with a curing agent containing an aromatic polyamine crosslinker composed of diethyltoluenediamine and a plasticizer, and the obtained mixture is subjected to coating and curing. The plasticizer is contained in the curing agent in an amount of 20 to 130 parts by weight per 100 parts by weight of the prepolymer of the base. The base is mixed with the curing agent in such proportions that the equivalent ratio of the NCO groups of the prepolymer contained in the base to the $NH_2$ groups of the aromatic polyamine contained in the curing agent ranges from 0.8 to 2.0.

7 Claims, No Drawings

PROCESS FOR PRODUCING RAPIDLY CURABLE COLD-SETTING POLYURETHANE COATING WATERPROOFER

TECHNICAL FIELD

The present invention relates to a process for producing a polyurethane coating waterproof material, or waterproofer which is rapidly cured at ordinary temperatures. More particularly, the present invention is concerned with a process for producing a polyurethane coating waterproofer which retains a pot life (a period of time during which coating is possible) suited for, especially, hand coating.

Background Art

The polyurethane coating waterproofer has been employed in a large quantity in various uses such as waterproofing of building rooftops, verandas and corridors, and elastic paving of sports facilities. This polyurethane coating waterproofer is prepared by in-situ mixing together two liquids, i.e., a base composed of an isocyanate-terminated prepolymer obtained by reacting a polyol such as a polyoxypropylene polyol with tolylene diisocyanate (hereinafter referred to simply as "TDI") and a curing agent comprising 4,4'-methylenebis(2-chloroaniline) (hereinafter referred to simply as "MOCA") and a polyoxypropylene polyol as an isocyanate-reacting component and, added thereto, a catalyst such as an organometallic lead and, if desired, a plasticizer, followed by hand coating with the use of a trowel, a spatula or a rake, and curing.

The MOCA employed as the principal isocyanate-reacting component of the curing agent in the conventional method is one of the Specified and Designated Chemical Substances under the MITI/MHW in Japan, thus being problematic in safety, and is solid and highly crystalline at room temperature, thus being poor in dissolution stability in the plasticizer and difficult to handle; nevertheless, it reacts with the isocyanate relatively mildly and can ensure a pot life (a period of time elapsed after the mixing of the two liquids during which the mixture can be applied without causing any trouble, generally defined as the time elapsed after the mixing up until a viscosity increase to one hundred thousand centipoises) particularly required in the use as a waterproofer. Further its use ensures the retention of various properties as prescribed with respect to the urethane coating waterproofer by the Japanese Industrial Standard (JIS-A-6021). Therefore, MOCA is substantially a sole aromatic polyamine crosslinker which can be utilized in the field of this type of waterproofer. Especially in the summertime application, frequent use is made of what is known as a modified MOCA which exhibits a functionality somewhat higher than that of MOCA per se and is modified with aniline so as to have swelling and foaming resistances.

When the above MOCA or modified MOCA is used alone as a curing agent, the drawback is brought about that the period during which the coating is in a plastic state is prolonged in the initial stage of the curing of the coating (around the gelation point), so that during this period the coating is likely to suffer from cracking. Therefore, a curing agent comprising a combination of MOCA with a polyol has been employed in which MOCA is dissolved in a polyoxypropylene polyol capable of dissolving MOCA at a relatively high solubility. The reaction of the polyoxypropylene polyol contained in the curing agent with the isocyanate is slower than that of water or MOCA. Consequently, it is essential to add an organometallic lead catalyst such as lead octoate (lead content: 20%) to the curing agent for the purpose of promoting the reaction between the polyoxypropylene polyol of the curing agent and the isocyanate to thereby prevent foaming. Thus, the organometallic lead catalyst is added in an amount of about 2 parts by weight per 100 parts by weight of the isocyanate-terminated prepolymer during the summertime for the prevention of foaming while it is added in an amount of about 4 parts by weight during the wintertime for the promotion of curing.

Meanwhile, what is known as RIM is in use in the manufacture of automobile parts and the like. In the RIM, a highly reactive two-part urethane material consisting of a curing agent containing highly reactive diethyltoluenediamine (DETDA) as the principal component of an aromatic polyamine crosslinker and a base containing an isocyanate component of 4,4'-diphenylmethane diisocyanate is instantaneously mixed together by means of a high-pressure collision mixer and injected into a mold, wherein the two-part urethane material is cured to thereby give a molded article. Further, recently, the process for producing a polyurethane coating waterproofer in which the above highly reactive two-part urethane material is applied by spray coating and instantaneously cured is being generalized. This highly reactive two-part urethane material can be cured at such a high rate that it takes only about 10 sec from the mixing of the two parts to the gelation thereof.

However, the curing properties are poor especially during the wintertime in the conventional process for producing a polyurethane coating waterproofer with the use of the above curing agent comprising a combination of MOCA with a polyol, and it sometimes occurs that the tack of the coating remains even on the day subsequent to the application to thereby disenable execution of the subsequent steps such as application of a top coating. Further, recently, a demand for shorter term of work and work rationalization is strong from every quarter. Thus, a rapidly curable waterproofer is demanded which can be cured within about 5 hr so as to enable execution of the subsequent step of application of a top coating on the day of waterproofer coating while retaining a pot life which enables the waterproofer coating. Although the curing time can be shortened to a certain extent by increasing the amount of the organometallic lead catalyst such as lead octoate even in the use of the conventional curing agent comprising a combination of MOCA with a polyol, the increase of the amount of the organometallic catalyst intensifies the deterioration of the heat resistance of the cured coating, so that, in the case of, for example, lead octoate (lead content: 20%), the upper limit of addition is 4 to 5 parts by weight per 100 parts by weight of the isocyanate-terminated prepolymer. Therefore, the conventional curing agent comprising a combination of MOCA with a polyol is not always satisfactory from the viewpoint of rapid curability.

Furthermore, during the summertime, the amount of the added lead octoate must be limited to about 2 parts by weight for ensuring an appropriate pot life, so that the problems of foaming and swelling frequently occur at high temperature and humidity, thereby disenabling excellent finishing. Still further, it has been found that the cured coating obtained by the conventional process tends to have its properties gradually deteriorated when immersed in hot water for a prolonged period of time, so that it is slightly insecure in the long-term water resistance.

In addition, the use of MOCA, one of the Specified and Designated Chemical Substances, as an aromatic polyamine crosslinker contained in a curing agent is not desirable from the viewpoint of safety because many unspecified workers handle various materials at the site of application of a polyurethane coating waterproofer. Therefore, various studies have been conducted with a view toward obtaining a physiologically safe aromatic polyamine crosslinker which can replace MOCA. However, any aromatic polyamine which is rapidly cured while retaining a desired pot life in coating application and which gives a coating waterproofer having properties as provided for in the Japanese Industrial Standard has not yet been discovered.

Meanwhile, the process for producing a polyurethane coating waterproofer in which a very rapidly curable highly reactive two-part urethane material is applied by spray coating and is instantaneously cured has drawbacks in that mist scattering occurs at the time of spray coating, that the coating surface lacks leveling properties and that a pot life desired for hand coating cannot be realized at all.

Disclosure of the Invention

Therefore, the present invention has been made with a view toward providing a process for producing a cold-setting polyurethane coating waterproofer in which use can be made of a highly safe aromatic polyamine crosslinker capable of replacing MOCA as the Specified and Designated Chemical Substance, which can be rapidly cured even at low temperatures during the wintertime so as to leave no after-tack irrespective of the absence of any organometallic catalyst, which does not suffer from foaming even at high temperature and humidity during the summertime to thereby form a coating film excellent in heat and water resistances and which can retain a pot life suited for hand coating.

The inventors have made various investigations to find out that the use of highly reactive DETDA as the principal component of an aromatic polyamine crosslinker and mixing a curing agent, obtained by blending the DETDA with a given amount of a plasticizer, with the conventional base whose principal component is an isocyanate-terminated prepolymer in given proportions at an application site prior to hand coating enable not only rapid curing while ensuring the retention of a required pot life but also production of a polyurethane coating waterproofer with less foams which has the properties prescribed in the Japanese Industrial Standard and is excellent in heat and water resistances. The present invention has been completed on the basis of the above-described finding. It has wholly been unexpected that a desired pot life can be retained even when DETDA which is highly reactive as compared with MOCA is employed in place of MOCA as an aromatic polyamine crosslinker in a polyurethane coating waterproofer for hand coating.

Accordingly, the present invention provides a process for producing a rapidly curable cold-setting polyurethane coating waterproofer retaining a required pot life by mixing a base whose principal component is an isocyanate-terminated prepolymer obtained by reacting TDI with a polyol with a curing agent containing an aromatic polyamine crosslinker and a plasticizer, followed by coating and curing, which process is characterized by:

(a) using a polyoxypropylene polyol and/or a polyoxyethylenepropylene polyol as the principal component of the polyol to be reacted with TDI, (b) using DETDA as the principal component of the aromatic polyamine crosslinker contained in the curing agent, (c) using the plasticizer contained in the curing agent in an amount of 20 to 130 parts by weight per 100 parts by weight of the isocyanate-terminated prepolymer, and (d) in-situ mixing the base with the curing agent in such proportions that the equivalent ratio of the isocyanate groups (hereinafter referred to as "NCO groups") of the prepolymer contained in the base to the amino groups (hereinafter referred to as "$NH_2$ groups") of the aromatic polyamine contained in the curing agent ranges from 0.8 to 2.0, followed by coating and curing.

A rapidly curable polyurethane coating waterproofer suited for hand coating cannot be obtained through mere replacement of only MOCA by DETDA in the conventional curing agent composition comprising a combination of MOCA with a polyol, namely, by the employment of DETDA in combination with a polyol and an organometallic lead catalyst as in the prior art. In the present invention, the polyol and organometallic lead catalyst which have been regarded as indispensable in the use of MOCA as the principal component of the curing agent are not used as the indispensable components, and a plasticizer which has never been regarded as an indispensable component is incorporated in a given proportion as an indispensable component. Thus it has become possible to produce a cold-setting polyurethane coating waterproofer which is markedly improved in curability as compared with that of the prior art during the wintertime and does not suffer from foaming even at high temperature and humidity during the summertime while ensuring the retention of a pot life suited for hand coating to hereby form a coating film excellent in heat and water resistances.

The process of the present invention is similar to the prior art in that the isocyanate-terminated prepolymer constituting the principal component of a base is formed by the reaction between excess TDI and a polyol. In the process of the present invention, a polyoxypropylene polyol or a polyoxyethylenepropylene polyol is used as the principal component of the polyol to be reacted with TDI. Instead, a mixture thereof may be used. In this prepolymer formation, it is preferred that the amount of TDI remaining in free form in the obtained isocyanate-terminated prepolymer be as small as possible. Therefore, it is preferred that the reaction be conducted by charging TDI and the polyol at an equivalent ratio of the NCO groups to the OH groups of around 2 as usual. However, even if surplus TDI is charged and reacted, the resultant prepolymer can be used by removing free TDI by vacuum distillation or other methods after the completion of the reaction.

Commercially available TDI whose 2,4-isomer content ranges from 65 to 100% by weight can be used as the starting TDI in the production of the isocyanate-terminated prepolymer. The isocyanate-terminated prepolymer formed from TDI whose 2,4-isomer content is low is likely to have a short pot life. Therefore, for obtaining a desired pot life, it is preferred to employ TDI whose 2,4-isomer content is at least 80% by weight, especially at least 85% by weight.

The polyoxypropylene polyol and polyoxyethylenepropylene polyol as the other principal starting material for use in the production of the isocyanate-terminated prepolymer are obtained by conducting the addition polymerization of propylene oxide and the addition polymerization of propylene oxide and ethylene oxide, respectively, with a low molecular weight polyol such as ethylene glycol, propylene glycol, glycerol or trimethylolpropane. Each of the obtained polyols is generally known by a simple designation PPG. Besides PPG, generally, a polyoxytetramethylene glycol, a polycaprolactone polyol, a polyester polyol and the like are employed as the polyol in the production of the isocyanate-terminated prepolymer. However, the isocyanate-terminated prepolymer produced from each of these as the starting material is either highly viscous or crystalline at ordinary temperatures and tends to shorten the pot life. Therefore, in the present invention, a polyoxypropylene polyol and/or a polyoxyethylenepropylene polyol constitutes the principal component of the polyol for use in the production of the isocyanate-terminated prepolymer. Moreover, what is known as a polymer polyol can be used which is obtained by polymerizing a monomer such as styrene or acrylonitrile in a reaction solvent composed of a polyoxyethylenepropylene polyol.

It is preferred that the isocyanate-terminated prepolymer have an NCO group content ranging from 1.5 to 5.0% by weight. When the NCO group content exceeds 5.0% by weight, the combination with the curing agent used in the present invention results in so fast reaction as to render the retention of a desired pot life difficult. On the other hand, the use of a prepolymer having an NCO group content smaller than 1.5% by weight renders it difficult to retain the properties desired for the polyurethane coating waterproofer.

For obtaining the desired isocyanate-terminated prepolymer suitable for use in a waterproofer, it is preferred that the polyoxypropylene polyol and/or polyoxyethylenepropylene polyol to be employed as the starting polyol have an average molecular weight of 1500 to 8000, especially, 1700 to 6000. It is further preferred that 30 to 90% by weight of the above polyol be a diol.

In the process of the present invention, the DETDA employed as the principal component of the aromatic polyamine crosslinker in the curing agent is 3,5-diethyltoluene-2,4- or 2,6-diamine. Those having varied isomer contents are commercially available. For example, use can be made of commercially available Ethacure 100 (trade name for 80/20 (in weight ratio) mixture of the 2,4-isomer and the 2,6-isomer produced by Ethyl Corporation). This DETDA has been registered as one of the Existing Chemical Substances under the MITI/ML in Japan and is safe as different from MOCA commonly employed as an aromatic polyamine in the prior art. Thus, its production and use are free from any restraint. In the present invention, the use of the above highly reactive DETDA as the principal component of the aromatic polyamine crosslinker enables production of a cold-setting coating waterproofer which can be rapidly cured even at the application at ordinary or low temperatures (during the wintertime) irrespective of the absence of any organometallic lead catalyst, which does not suffer from foaming even at high temperature and humidity during the summertime and whose curing is completed within a few hours after the coating application without any surface tack left to thereby form a coating film having excellent heat and water resistances which have never been realized in the prior art.

Conventional plasticizers which are not reactive with the NCO groups of the isocyanate-terminated prepolymer contained in the base can be used as the plasticizer to be employed as an indispensable component of the curing agent in the process of the present invention. Examples of such plasticizers include dibutyl, diheptyl, dioctyl and butyl benzyl phthalates, dioctyl adipate, chlorinated paraffin, and tris(β-chloropropyl)phosphate.

The above plasticizer should be contained in the curing agent in an amount of 20 to 130 parts by weight per 100 parts by weight of the isocyanate-terminated prepolymer of the base. When the amount of the plasticizer is less than 20 parts by weight, no pot life suitable for hand coating can be realized. On the other hand, when the amount exceeds 130 parts by weight, not only is a plasticizer bleedout increasingly likely to occur on the coating surface but also the resultant cured coating film has deteriorated properties.

Although the polyol which has been employed as a crosslinker component of the conventional curing agent comprising a combination of MOCA with a polyol is not an indispensable component of the curing agent to be employed in the present invention, it can be blended as a plasticizer into the curing agent in the present invention irrespective of the possibility of the polyol's finally reacting with the isocyanate groups because its reactivity is lower than that of DETDA and because it exerts the same function as that of a plasticizer retarding the reactivity of DETDA especially in the initial stage of curing. Examples of the polyols blended as the plasticizer into the curing agent in the present invention include a polycaprolactone polyol, a polyester polyol, a polyoxytetramethylene glycol and castor oil. Of these, preferred use is made of a polyoxypropylene polyol or polyoxyethylenepropylene polyol of 400 to 10,000 in molecular weight which is liquid at room temperature and has a low viscosity. When the polyol is used as the plasticizer, it is preferred that its amount be not greater than 60 parts by weight per 100 parts by weight of the base prepolymer. When the polyol is used in an amount exceeding 60 parts by weight, unfavorably bleedout is likely to occur or the mechanical properties of the coating film are deteriorated. It is most advantageous to use the regular plasticizer in an amount of at least 20 parts by weight with the total of the regular plasticizer and polyol employed limited to 130 parts by weight or less. The regular plasticizer can be blended not only into the curing agent but also into the base.

A highly active aromatic amine, i.e., DETDA is employed as a crosslinker in the process of the present invention, so that the catalyst commonly employed in the art is not an indispensable component and is in principle not used. However, a small amount of an organometallic catalyst such as lead octoate or lead naphthenate may be added to the curing agent according to necessity for regulation of the curing rate of the coating film. Further, a small amount of an organic acid such as octylic or oleic acid can be added. Also, any of conventional urethane catalysts such as tin catalysis and tertiary amines can be added as long as the amount thereof is small. Still further, any of general retarders can be added according to necessity. For example, in the use of lead octoate (lead content: 20%), its addition to the curing agent in an amount as small as 2% by weight or less leads to accomplishment of a rapid curing even at the application at low temperatures (during the wintertime). The use of such a small amount of the catalyst does not deteriorate the heat resistance of the cured coating film.

An inorganic filler such as calcium carbonate, talc, kaolin, zeolite or diatom earth, a pigment such as chromium oxide, red iron oxide, iron oxide, carbon black or titanium oxide, and a stabilizer such as an hindered amine, a hindered phenol or a benzotriazole compound can be added according to necessity to the curing agent for use in the process of the present invention.

In practicing the process of the present invention, the base whose principal component is an isocyanate-terminated prepolymer obtained by reacting TDI with a polyoxypropylene polyol and/or a polyoxyethylenepropylene polyol is in-situ mixed with the curing agent comprising an aromatic polyamine crosslinker whose principal component is DETDA and a given amount of a plasticizer optionally together with small amounts of catalyst, filler, pigment, stabilizer and the like in such proportions that the equivalent ratio of the NCO groups of the prepolymer contained in the base to the $NH_2$ groups of the aromatic polyamine contained in the curing agent ranges from 0.8 to 2.0, applied onto a substrate by hand coating, and cured. When the equivalent ratio of the NCO groups present in the base to the $NH_2$ groups present in the curing agent is less than 0.8, no desired pot life can be secured, the properties are deteriorate, and yellowing attributed to free amines becomes grave. On the other hand, when the above-described equivalent ratio exceeds 2.0, the curing is so retarded that rapid curability is no longer exhibited. Taking into account the properties of the coating film as well, the most suitable equivalent ratio of the NCO groups to the $NH_2$ groups ranges from 0.8 to 1.7. A pot life ranging from 15 min to 120 min can be secured at an application environment temperature (5° to 35° C. in the use of conventional urethane waterproofer) by mixing the base with the curing agent in the above-specified proportions. As long as a pot life of 15 min or more is ensured at an application environment temperature, repair or small-area coating application can be accomplished. When the pot life exceeds 120 min, the curing becomes slow unfavorably. When the pot life at 20° C. is 15 min or more, still preferably a large-area coating application during the wintertime can be conducted sufficiently and slowly. Although as mentioned above the conventional urethane waterproofer has its curability extremely deteriorated at low temperatures, for example, 0° C., or below during the wintertime so as to frequently disenable coating application, the cold-setting polyurethane coating waterproofer according to the process of the present invention can be rapidly cured at low temperatures, for example, about −10° C. to thereby enable coating application. A cured coating film which has a hardness (JIS hardness A) of 30 to 75 and excellent heat and water resistances and is free from after-tack can be obtained by the process of the present invention, thereby attesting to the suitability of the coating waterproofer.

The process of the present invention is suited to mixing and coating conducted by manual operation. However, the pot life and time available for leveling can be so prolonged that it can be applied to mechanical coating provided with the same leveling properties as in hand coating in which an automatic mixer such as a static mixer or a dynamic mixer is employed. Further, vertical, wall and curved surfaces can be coated with the waterproofer having an anti-sage agent incorporated therein according to the conventional method using a roller, a spray gun for stucco finish or an airless gun.

Moreover, the coating waterproofer according to the present invention can be employed in the conventional waterproofer uses such as a flooring material applied for suppressing the sounding of a corridor and stairs or for mortar protection or dustproofing, a rust preventive applied for preventing the corrosion of metals, and a caulking material. Depending on the workability, a solvent such as xylene or toluene can be added to the waterproofer prior to its application.

BEST MODE FOR CARRYING OUT THE INVENTION

The present invention will now be described with reference to the following Examples and Comparative Examples. In connection with the Examples and Comparative Examples, the materials and test items listed in the recipes (Tables 1, 3 and 5) and test results (Tables 2, 4, 6 and 7) are as follows:

[Base]
- D-2000: polyoxypropylene diol having a molecular weight of 2000 (trade name "Actocol P-2020" produced by Takeda Chemical Industries, Ltd.).
- D-2000*: polyoxyethylenepropylene diol having a molecular weight of 2000 (trade name "Exenol 2026T" produced by Asahi Glass Co. Ltd.).
- D-3000: polyoxypropylene diol having a molecular weight of 3000 (trade name "Actocol P-23" produced by Takeda Chemical Industries, Ltd.).
- D-400: polyoxypropylene diol having a molecular weight of 400 (trade name "Actocol P-400" produced by Takeda Chemical Industries, Ltd.).
- T-3000: polyoxypropylene triol having a molecular weight of 3000 (trade name "Actocol P-3030" produced by Takeda Chemical Industries, Ltd.).
- T-5000: polyoxypropylene triol having a molecular weight of 5000 (trade name "Actocol 35–34" produced by Takeda Chemical Industries, Ltd.).

[Curing agent]
- DETDA: diethyltoluenediamine (trade name "Ethacure 100" produced by Ethyl Corporation).
- MOCA: 4,4'-methylenebis(2-chloroaniline) (produced by Ihara Chemical Industry Co., Ltd.).
- DOP: dioctyl phthalate (plasticizer produced by Daihachi Chemical Industry Co., Ltd.).
- Polyol: polyoxypropylene diol D-2000, provided that it represents polyoxyethylenepropylene diol D-2000* in Example 14.
- Calcium carbonate: inorganic filler (produced by Maruo Calcium Co, Ltd.).
- Lead octoate: lead content=20% by weight (catalyst produced by Nihon Kagaku Sangyo Co, Ltd.).
- $NCO/NH_2$ equivalent ratio: equivalent ratio of the NCO groups of the isocyanate-terminated prepolymer contained in the base to the $NH_2$ groups of the aromatic polyamine crosslinker contained in the curing agent (provided that it represents the equivalent ratio of the NCO groups to the ($NH_2$+OH) groups in each of Comparative Examples 7 and 8 and the prior art process of Example 16).

[Pot life and curability]
- Pot life: period of time (min) elapsed after the mixing of the base and the curing agent during which the mixture can be applied without causing any trouble (time during which the viscosity of the mixture increases to one hundred thousand centipoises).
- Tack-free time: period of time (hr) during which the coating surface is freed of its stickiness (time elapsed after the coating application until the worker can walk on the coating film).

[Properties of cured coating film]
- Fundamental properties: results of tests of the properties of the cured coating film left to stand still at 20° C. for 7 days after the coating application, the tests being conducted in accordance with JIS-A-6021.
- Heat resistance: results of tests of the properties of the cured coating film left to stand still at 20° C. for 7 days after the coating application and then heated in an oven at 80° C. for 7 days.
- Retention of tensile strength: ratio (%) of the tensile strength exhibited after the heat resistance test to the tensile strength include in the fundamental properties, a range from 80% to 150% being provided for in the Japanese Industrial Standard.

Preparation of base (isocyanate-terminated prepolymer)

In accordance with the recipes for Examples and Comparative Examples specified in Tables 1, 3 and 5, appropriate TDI (selected from among 70/30, 80/20, 85/15 and 100/0 by weight mixtures of the 2,4-isomer and the 2,6-isomer) was charged into a 2-L glass flask, and appropriate polyol (selected from among D-2000, D-2000*, D-3000, D-400, T-3000 and T-5000) was gradually added thereto under a nitrogen stream at appropriate equivalent ratio of charged NCO groups to OH groups. Each mixture was heated at 80° to 105° C. for 4 to 8 hr under agitation to thereby complete the reaction. Thus, each desired isocyanate-terminated prepolymer was prepared.

Preparation of curing agent

In accordance with the recipes for Examples and Comparative Examples specified in Tables 1, 3 and 5, DETDA, DOP, polyol (Examples 13 and 14, Comparative Examples 7 and 8 and the prior art process of Example 16), calcium carbonate (not used in Comparative Example 3 only because the amount of employed plasticizer is small) and lead octoate (Examples 4 and 14, Comparative Examples 7 and 8 and the prior art process of Example 16) were appropriately charged into a 2-L cylindrical open vessel. Each mixture was agitated at room temperature for 15 min by means of a dissolver, thereby preparing each desired curing agent. In the preparation of each of the curing agents of Comparative Examples 7 and 8 and the prior art process of Example 16, use was made of MOCA dissolved in polyol (D-2000) under heating.

EXAMPLE 1

148.2 g of TDI composed of an 80/20 by weight mixture of the 2,4-isomer and the 2,6-isomer was charged into a 2-L glass flask. 681.4 g of D-2000 and 170.4 g of T-3000 (D-2000/T-3000=80/20 on the weight basis) were gradually added thereto. The mixture was heated to 80° C., and the temperature of the mixture was raised under agitation to 90° to 100° C., at which the mixture was held for 5 hr to thereby complete the reaction. Thus, 1000 g of an isocyanate-terminated prepolymer (base) having an NCO group content of 3.5% by weight was prepared.

Separately, 62 g of DETDA, 438 g of DOP and 500 g of calcium carbonate were charged into a 2-L cylindrical open vessel and agitated by means of a dissolver at room temperature for 15 min. Thus, 1000 g of a curing agent was prepared.

The thus prepared base and curing agent were each halved, allowed to stand still in respective atmospheres of 5° C. and 20° C. for at least 2 hr, and mixed in a weight ratio of 1:1 (equivalent ratio of NCO groups to $NH_2$ groups being 1.2) in the same atmosphere. While checking the pot life thereof, the mixture was applied by hand coating onto a primer-treated slate by means of a trowel or spatula so as to form a coating film of 1 to 2 mm in thickness.

Part of the mixture of the base with the curing agent obtained at 20° C. was cast on a glass plate in a thickness of 1 to 2 mm and allowed as it was to stand still at 20° C. for 7 days to thereby effect curing. The resultant cured coating film was shaped into test pieces for measuring the properties thereof (fundamental properties and heat resistance).

As a result, as specified in Table 2, the pot life at 5° C. was 32 min and the mixture became tack-free 3.5 hr later. The curability at the low temperature was excellent, and the mixture exhibited such a rapid curability that the curing proceeded at a rate at which the subsequent step (top coating application) could be executed on the same day. On the other hand, the pot life at 20° C. was 22 min, thereby ensuring retention of a desired pot life. The tack-free time was 2.5 hr, thereby ensuring a rapid curability. The fundamental properties and heat resistance of the cured coating film allowed to stand still at 20° C. for 7 days are as given in Table 2, exhibiting performance fully satisfying the coating waterproofer standards provided for in the Japanese Industrial Standard.

EXAMPLES 2 TO 4

The same procedure as in Example 1 was repeated in Examples 2 and 3, except that prepolymers prepared using TDIs composed of 85/15 and 100/0 by weight mixtures of the 2,4-isomer and the 2,6-isomer were respectively employed as the principal component of the base. In Example 4, a small amount of lead octoate (lead content: 20% by weight) was added to the curing agent. In Example 3, the pot life and tack-free time were also tested at a temperature as high as 35° C. (imagining the summertime).

The results are as given in Table 2. As apparent from Table 2, the greater the 2,4-isomer content of the starting TDI, the longer the pot life, thereby facilitating retention of a desired pot life while there was a tendency for the curability to be slightly lowered. However, as shown in Example 3, despite the lowering of the curability, the mixture became tack-free within 5 hr even at low temperature (5° C.), thereby still having a rapid curability. Furthermore, even at high temperature (35° C.), a pot life of 15 min was retained, thereby forming a foamless finely finished cured coating film. All of the resultant cured coating films possessed the properties suited to use as a waterproofer.

Example 4 was an embodiment in which a small amount of the catalyst was added to the curing agent of the composition of Example 3. The results showed that the curing rate was increased as compared with that of Example 3, and that the addition of such a level of catalyst did not deteriorate the heat resistance of the final coating film while ensuring retention of a desired pot life.

EXAMPLES 5 AND 6

The same procedure as in Examples 1 to 3 was repeated in Examples 5 and 6, except that the NCO group contents of the prepolymers of the base were respectively lower and higher than that of Examples 1 to 4 (NCO group content: 3.5% by weight) and that the amount of DETDA added to the curing agent was changed so as to adjust each equivalent ratio of the NCO groups present in the base to the $NH_2$ groups present in the curing agent to 1.2.

The results of Table 2 showed that the use of a prepolymer having an NCO group content as low as 1.8% by weight (Example 5) resulted in a tack-free time of 6 hr exhibiting rapid curability while the pot life was as satisfactorily long as 47 min. Further, with respect to the properties of the cured coating film, the coating film retained performance as a waterproofer although the hardness was slightly lowered and the modulus was also likely to be lowered.

In Example 6, a pot life of 20 min was retained while a rapid curability was realized because of the use of a prepolymer having an NCO group content as high as 4.8% by weight. The properties of the resultant cured coating film were excellent although the modulus was relatively high.

EXAMPLES 7 TO 9

The effects of changes in the amount of the plasticizer added to the curing agent as compared with that of Examples 1 to 6 were tested in Examples 7 and 8, respectively. In Example 7, the amount of added calcium carbonate (inorganic filler) was reduced to 30 parts by weight in accordance with the decrease of the amount of the added plasticizer. In Example 8, the amount of the added calcium carbonate was increased in accordance with the increase of the amount of the added plasticizer. The mixing ratio of the base to the curing agent was changed to thereby adjust each equivalent ratio of the NCO groups to the $NH_2$ groups to 1.2.

The same procedure as in Example 8 was repeated in Example 9, except that use was made of a prepolymer prepared with the employment of TDI composed of a 70/30 by weight mixture of the 2,4-isomer and the 2,6-isomer as the starting material of the base.

As apparent from the results of Table 2, the curing rate was greater in Example 7 than in Example 5. In Example 8, a satisfactorily rapid curability was ensured although the curing rate was lower than in Example 3 and a desired pot life was retained even at high temperature (35° C.). In both of Examples 7 and 8, the properties of the cured coating films were so excellent as to ensure suitability to use as waterproofers. Example 9 showed that a desired pot life could be retained because of the addition of a large amount of the plasticizer to the curing agent irrespective of a lower content of the 2,4-isomer in the TDI employed in the base than that of Example 1.

EXAMPLES 10 TO 12

The amount of DETDA added to the curing agent was changed so as to change the equivalent ratio of the NCO groups of the basis agent to the $NH_2$ groups of the curing agent to 0.9, 1.6 and 1.9 as different from that of Examples 1 to 9 (NCO groups/$NH_2$ groups=1.2) with the employment of the same NCO group content of 3.5% by weight in the base.

The results of Table 2 showed that the curing rate was greater in Example 10 than in Example 8, in accordance with which there was a tendency toward shorter pot life. In Examples 11 and 12, the pot life was prolonged in accordance with the increase in NCO groups/$NH_2$ groups to 1.6 and further to 1.9 and also the tack-free time was retarded to reach 8 hr in Example 12. However, the performance as a waterproofer was retained.

EXAMPLES 13 AND 14

In Example 13, the effect of the addition of polyol (D-2000) to the curing agent as a plasticizer was tested with the use of the same prepolymer as in Examples 8, 10, 11 and 12 in the base. In Example 14, D-2000* was used as the polyol in the curing agent and a small amount of catalyst was added thereto.

As apparent from Table 2, both the pot life and the curability were within the desired ranges and the properties of the cured coating films were excellent as long as the amount of the polyol added to the curing agent was on such a level.

EXAMPLE 15

The same procedure as in Example 3 was repeated, except that use was made of a prepolymer prepared with the employment of polyoxyethylenepropylene diol (D-2000*) in place of polyoxypropylene diol (D-2000) as the polyol for use as the starting material of the base.

As apparent from Table 2, the results were that the pot life was satisfactorily within the practicable range although it was slightly shorter than in Example 3, that the curing rate was high, and that the properties of the coating film were also excellent.

Comparative Examples 1 and 2

The same procedure as in Examples 5 and 6 was repeated, except that the NCO group contents of the bases were lower and higher in Comparative Examples 1 and 2, respectively, than that of Examples 5 and 6 and that the amount of the DETDA added to the curing agent was changed so as to adjust each equivalent ratio of the NCO groups present in the base to the $NH_2$ groups present in the curing agent to 1.2.

As apparent from Table 4, the results were obtained that the lowering of the NCO group content of the base to 1.2% by weight (Comparative Example 1) caused the cured coating film to have low hardness and poor mechanical strength to thereby fail to satisfy the waterproofer standards provided for in the Japanese Industrial Standard although the pot life was satisfactory. On the other hand, the increase of the NCO group content of the base to 8% by weight (Comparative Example 2) caused the pot life to become as short as 8 min to thereby fail to retain a desired pot life although the curing rate was high.

Comparative Examples 3 and 4

The effects of changes in the amount of the plasticizer added to the curing agent were tested. As in Comparative Example 3, the decrease of the amount of the plasticizer to 4.8 parts by weight per 100 parts by weight of the prepolymer of the base caused the pot life to become as short as 5 min to thereby fail to retain a desired pot life. On the other hand, as in Comparative Example 4, the increase of the amount of the plasticizer to 143.8 parts by weight per 100 parts by weight of the prepolymer of the base caused the surface of the cured coating film to suffer from bleeding of the plasticizer. Thus, in both the cases, no coating waterproofer desired in the present invention could be obtained. That is, taking into account the above-mentioned results of Examples 3, 7 and 8, it is concluded that there is a given restrictive range with respect to the amount of the added plasticizer for attaining the object of the present invention and that the amounts employed in Comparative Examples 3 and 4 fall outside the range.

Comparative Examples 5 and 6

The equivalent ratio of the NCO groups present in the base to the $NH_2$ groups present in the curing agent was low in Comparative Example 5 and high in Comparative Example 6. As apparent from Table 4, the results were obtained that the decrease of the equivalent ratio of NCO groups to $NH_2$ groups to 0.7 (Comparative Example 5) caused the pot life to become as short as 5 min to thereby fail to retain a desired pot life and that, on the other hand, the increase of the equivalent ratio of NCO groups to $NH_2$ groups to 2.4 (Comparative Example 6) caused the tack-free time to become as long as 28 hr to thereby fail to attain a desired rapid curability although the pot life was as satisfactorily long as 100 min. That is, taking into account the above-mentioned results of Examples 3, 10, 11 and 12, it is concluded that there is a given restrictive range with respect to the equivalent ratio of the NCO groups present in the base to the $NH_2$ groups present in the curing agent for attaining the object of the present invention.

Comparative Examples 7 and 8

In Comparative Example 7, use was made of a curing agent composed of a combination of MOCA with a polyol together with a catalyst according to the prior art. In Comparative Example 8, the amount of the catalyst was slightly increased over the conventional level for accelerating the curing of this system. TDI composed of an 80/20 by weight mixture of the 2,4-isomer and the 2,6-isomer was used as a starting material of the prepolymer of the base.

As apparent from Table 4, the results were obtained that, in Comparative Example 7 according to the prior art, the tack-free time was as long as 20 hr at 20° C. and further as long as 40 to 50 hr at temperature as low as 5° C. to thereby exhibit such a slow curability that frequently the subsequent step cannot be executed even on the day next to the coating application although the pot life was satisfactorily long. In Comparative Example 8, the amount of the catalyst was increased for promoting the curing at low temperatures, so that the tack-free time was slightly accelerated to 20 hr at 5° C. However, the retention of the tensile strength of the coating film was lowered to 68%, thereby exhibiting a tendency toward heat deterioration. Thus, it is apparent that, in the prior art, the attempt to attain a rapid curability merely by increasing the amount of the catalyst encounters a limit.

TABLE 1

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| base (isocyanate-terminated prepolymer) | | | | | | | | | | |
| wt. ratio of 2,4-/2,6-isomer in charged TDI | | 80/20 | 85/15 | 100/0 | ← | ← | ← | ← | ← | 70/30 |
| charged polyol | D-2000 (wt. ratio) | 80 | ← | ← | ← | — | 67.7 | — | 80 | ← |
|  | D-3000 (wt. ratio) | — | — | — | — | 67.7 | — | 67.7 | — | — |
|  | D-400 (wt. ratio) | — | — | — | — | — | 12.3 | — | — | — |
|  | T-3000 (wt. ratio) | 20 | ← | ← | ← | — | 20 | — | 20 | ← |
|  | T-5000 (wt. ratio) | — | — | — | — | 32.3 | — | 32.3 | — | — |
| equiv. ratio of charged NCO/OH | | 2.0 | ← | ← | ← | 1.75 | 2.0 | 1.75 | 2.0 | ← |
| NCO content of prepolymer (wt. %) | | 3.5 | ← | ← | ← | 1.8 | 4.8 | 1.8 | 3.5 | ← |
| curing agent | | | | | | | | | | |
| in curing agent | DETDA (pts. wt.) | 6.2 | ← | ← | ← | 3.2 | 8.5 | 3.2 | 6.2 | ← |
|  | MOCA (pts. wt.) | — | — | — | — | — | — | — | — | — |
|  | DOP (pts. wt.) | 43.8 | ← | ← | ← | 46.8 | 41.5 | 26.8 | 93.8 | ← |
|  | polyol (pts. wt.) | — | — | — | — | — | — | — | — | — |
|  | calcium carbonate (pts. wt.) | 50 | ← | ← | ← | ← | ← | 30 | 100 | ← |
|  | lead octoate (pts. wt.) | — | — | — | 0.25 | — | — | — | — | — |
| wt. ratio of base/curing agent | | 1/1 | ← | ← | ← | ← | ← | 1/0.6 | 1/2 | ← |
| NCO/NH$_2$ equiv. ratio of base/curing agent | | 1.2 | ← | ← | ← | ← | ← | ← | ← | ← |

|  |  | Ex. 10 | Ex. 11 | Ex. 12 | Ex. 13 | Ex. 14 | Ex. 15 |
|---|---|---|---|---|---|---|---|
| base (isocyanate-terminated prepolymer) | | | | | | | |
| wt. ratio of 2,4-/2,6-isomer in charged TDI | | 100/0 | ← | ← | ← | ← | ← |
| charged polyol | D-2000 (wt. ratio) | 80 | ← | ← | ← | ← | — |
|  | D-2000* (wt. ratio) | — | — | — | — | — | 80 |
|  | D-400 (wt. ratio) | — | — | — | — | — | — |
|  | T-3000 (wt. ratio) | 20 | ← | ← | ← | ← | ← |
|  | T-5000 (wt. ratio) | — | — | — | — | — | — |
| equiv. ratio of charged NCO/OH | | 2.0 | ← | ← | ← | ← | ← |
| NCO content of prepolymer (wt. %) | | 3.5 | ← | ← | ← | ← | ← |
| curing agent | | | | | | | |
| in curing agent | DETDA (pts. wt.) | 8.2 | 4.6 | 3.9 | 4.6 | ← | 6.2 |
|  | MOCA (pts. wt.) | — | — | — | — | — | — |
|  | DOP (pts. wt.) | 91.8 | 45.4 | 46.1 | 20 | 28 | 43.8 |
|  | polyol (pts. wt.) | — | — | — | 25.4 | 17.4 | — |
|  | calcium carbonate (pts. wt.) | 100 | 50 | ← | ← | ← | ← |
|  | lead octoate (pts. wt.) | — | — | — | — | 0.25 | — |
| wt. ratio of base/curing agent | | 1/2 | 1/1 | 1/1 | ← | ← | ← |
| NCO/NH$_2$ equiv. ratio of base/curing agent | | 0.9 | 1.6 | 1.9 | 1.6 | ← | 1.2 |

TABLE 2

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|---|---|---|---|---|
| pot life and curability | | | | | | | | | | | | | | | | |
| 5° C. | pot life (min) | 32 | 40 | 60 | 35 | | | | | | 60 | | | | | 55 |
|  | tack-free time (hr) | 3.5 | 4 | 5 | 3.5 | | | | | | 5 | | | | | 4.5 |
| 20° C. | pot life (min) | 22 | 28 | 33 | 20 | 47 | 20 | 25 | 60 | 40 | 30 | 45 | 55 | 35 | 26 | 30 |
|  | tack-free time (hr) | 2.5 | 3 | 3.5 | 2 | 6 | 2 | 3 | 5 | 4 | 3 | 4.5 | 8 | 4.5 | 3.5 | 3 |
| 35° C. | pot life (min) | | | 15 | | | | | 25 | | | | | | | |
|  | tack-free time (hr) | | | 1.5 | | | | | 3 | | | | | | | |

TABLE 2-continued

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|---|---|---|---|---|
| properties of cured coating film | | | | | | | | | | | | | | | | |
| fundamental properties | hardness | 62 | 61 | 60 | 61 | 48 | 73 | 49 | 50 | 51 | 55 | 51 | 45 | 50 | 52 | 57 |
| | elongation at break (%) | 660 | 680 | 720 | 700 | 650 | 510 | 700 | 820 | 810 | 780 | 930 | 1030 | 620 | 600 | 700 |
| | 100% modulus (kgf/cm$^2$) | 20.7 | 20.5 | 20.4 | 20.3 | 14 | 32 | 14.5 | 14.2 | 14.5 | 16.5 | 15.5 | 11.4 | 12.6 | 13.4 | 18 |
| | tensile strength (kgf/cm$^2$) | 84 | 84 | 83.6 | 83 | 38 | 77.5 | 40 | 51 | 53 | 54.6 | 69.5 | 55.6 | 44.2 | 46 | 80 |
| | tear strength (kgf/cm) | 28 | 27.8 | 27.3 | 27 | 16.5 | 28 | 18 | 18.3 | 19.2 | 20.5 | 22.9 | 19.8 | 17.2 | 19.2 | 25 |
| heat resistance | hardness | 64 | 64 | 64 | 64 | 52 | 74 | 53 | 55 | 55 | 60 | 53 | 48 | 51 | 53 | 60 |
| | elongation at break (%) | 670 | 680 | 680 | 670 | 700 | 500 | 750 | 760 | 750 | 770 | 780 | 750 | 610 | 600 | 680 |
| | 100% modulus (kgf/cm$^2$) | 22.1 | 22 | 21.8 | 21 | 14.5 | 33 | 15.7 | 14.9 | 15.2 | 18.8 | 16.6 | 13.8 | 12.5 | 13.8 | 19 |
| | tensile strength (kgf/cm$^2$) | 90.8 | 90.5 | 90.2 | 88 | 42 | 80 | 44.1 | 60.8 | 62 | 59 | 89.2 | 70 | 44.6 | 47 | 82 |
| | retention of tensile strength (%) | 108 | 108 | 108 | 106 | 110 | 103 | 110 | 119 | 117 | 108 | 128 | 126 | 101 | 102 | 104 |

TABLE 3

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| base (isocyanate-terminated prepolymer) | | | | | | | | | |
| wt. ratio of 2,4-/2,6-isomer in charged TDI | | 100/0 | ← | ← | ← | ← | ← | 80/20 | ← |
| charged polyol | D-2000 (wt. ratio) | — | 33.8 | 80 | ← | ← | ← | ← | ← |
| | D-3000 (wt. ratio) | 50 | — | — | — | — | — | — | — |
| | D-400 (wt. ratio) | — | 46.2 | — | — | — | — | — | — |
| | T-3000 (wt. ratio) | — | 20 | ← | ← | ← | ← | ← | ← |
| | T-5000 (wt. ratio) | 50 | — | — | — | — | — | — | — |
| equiv. ratio of charged NCO/OH | | 1.5 | 2.0 | ← | ← | ← | ← | ← | ← |
| NCO content of prepolymer (wt. %) | | 1.2 | 8.0 | 3.5 | ← | ← | ← | ← | ← |
| curing agent | | | | | | | | | |
| in curing agent | DETDA (pts. wt.) | 2.1 | 14.1 | 6.2 | 6.2 | 10.6 | 3.1 | — | — |
| | MOCA (pts. wt.) | — | — | — | — | — | — | 8.1 | ← |
| | DOP (pts. wt.) | 47.9 | 35.9 | 4.8 | 143.8 | 39.4 | 46.9 | 31.8 | ← |
| | polyol (pts. wt.) | — | — | — | — | — | — | 8.1 | 8.1 |
| | calcium carbonate (pts. wt.) | 50 | ← | — | 50 | ← | ← | ← | 46 |
| | lead octoate (pts. wt.) | — | — | — | — | — | — | 2 | 6 |
| wt. ratio of base/curing agent | | 1/1 | ← | 1/0.1 | 1/2 | 1/1 | ← | ← | ← |
| NCO/NH$_2$ equiv. ratio of base/curing agent | | 1.2 | ← | ← | ← | 0.7 | 2.4 | 1.2 | ← |

TABLE 4

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| pot life and curability | | | | | | | | | |
| 5° C. | pot life (min) | | | | | | | | 70 |
| | tack-free time (hr) | | | | | | | 40–50 | 20 |
| 20° C. | pot life (min) | 100 | 8 | 5 | | 5 | 100 | 100 | 40 |
| | tack-free time (hr) | 20 | 2 | 1.5 | | 2 | 28 | 20 | 8 |
| 35° C. | pot life (min) | | | | | | | 50 | |
| | tack-free time (hr) | | | | | | | 10 | |
| properties of cured coating film | | | | | | | | | |
| fundamental properties | hardness | 20 | 70 | 30 | bleeding of plasticizer | 35 | 47 | 48 | |
| | elongation at break (%) | 1000 | 500 | 300 | | 1090 | 580 | 500 | |
| | 100% modulus (kgf/cm$^2$) | 5 | 30 | 6 | | 7.7 | 14.4 | 15 | |
| | tensile strength (kgf/cm$^2$) | 18 | 95 | 20 | | 37.5 | 39.5 | 42.5 | |
| | tear strength (kgf/cm) | 10.3 | 31 | 10 | | 16.5 | 16.5 | 16.0 | |
| heat resistance | hardness | 28 | 74 | | | | 50 | 47 | |
| | elongation at break (%) | 1300 | 550 | | | | 740 | 900 | |
| | 100% modulus (kgf/cm$^2$) | 5 | 32 | | | | 19.4 | 14.2 | |
| | tensile strength (kgf/cm$^2$) | 16 | 98 | | | | 39.0 | 28.9 | |
| | retention of tensile strength (%) | 89 | 103 | | | | 99 | 68 | |

EXAMPLE 16

(foaming test)

The following experiments were performed with the use of two recipes as specified in Table 5, one according to the process of the present invention and the other according to the prior art process based on MOCA-polyol crosslinking in order to test the foaming properties at high temperature and high humidity (during the summertime).

With respect to each of the recipes, each of the base and the curing agent was divided into three portions to thereby prepare three base/curing agent groups. The base and curing agent of the first group were mixed together in an atmosphere of 20° C. and a relative humidity of 65% (standard conditions). With respect to both of the second and third groups, the base and curing agent were mixed together in an atmosphere of 35° C. and a relative humidity of 80%. With respect to the third group only, 1 part by weight of water was added to 100 parts by weight of the curing agent prior to mixing. After the mixing, the mixtures were cast on glass plates in the respective atmospheres so as to form films each of 1 to 1.5 mm in thickness. The film of the first group was cured by allowing it to stand still at 20° C. at a relative humidity of 65% for 7 days. The films of the second and third groups were cured by allowing them to stand still first at 35° C. at a relative humidity of 80% for 2 days and then at 20° C. at a relative humidity of 65% for 5 days (7 days in total). After the curing, the films were peeled from the glass plates and their specific gravities (water displacement method) and properties (in accordance with JIS-A-6021) were measured. The results are as given in Table 6.

Comparison of the foaming properties in terms of a specific gravity difference between the film cured at high temperature and high humidity (35° C. and a relative humidity of 80%; and addition of 1 wt. % of water to the curing agent) and the film cured under the standard conditions (20° C. and a relative humidity of 65%) showed that it was as small as −0.3 to −0.8% in the process of the present invention but it was as considerably large as −2.5 to −19.2% in the process of the prior art, thereby demonstrating the inclusion of a considerably large amount of foams in the cured coating film according to the process of the prior art. Accordingly, with respect to the properties of the cured coating films as well, 85 to 95% of the tensile strength was retained relative to that under the standard conditions in the process of the present invention but it was as low as 54 to 75% in the process of the prior art.

Illustratively, it was demonstrated that, in the process of the present invention, there would be little danger, if any, of foaming even under high-temperature and high-humidity conditions as actualized during the summertime, so that the process of the present invention could strikingly improve the foaming as a drawback of the prior art.

TABLE 5

| | | | Invention | Prior art |
|---|---|---|---|---|
| base (isocyanate-terminated prepolymer) | wt. ratio of 2,4-/2,6-isomer in charged TDI | | 80/20 | 80/20 |
| | charged polyol | D-2000 (wt. ratio) | 80 | 80 |
| | | T-3000 (wt. ratio) | 20 | 20 |
| | equiv. ratio of charged NCO/OH | | 1.9 | 1.9 |
| | NCO content of prepolymer | | 3.2 | 3.2 |

TABLE 5-continued

| | | | Invention | Prior art |
|---|---|---|---|---|
| curing agent | in curing agent | DETDA (pts. wt.) | 6.0 | — |
| | | MOCA (pts. wt.) | — | 6.3 |
| | | DOP (pts. wt.) | 69.0 | 43.2 |
| | | D-2000 (pts. wt.) | — | 20.5 |
| | | calcium carbonate (pts. wt.) | 125 | 128 |
| | | lead octoate (pts. wt.) | — | 2.0 |
| wt. ratio of base/curing agent | | | 1/2 | 1/2 |
| NCO/NH$_2$ equiv. ratio of base/curing agent | | | 1.13 | 1.13 |

TABLE 6

| | | | Invention | Prior art |
|---|---|---|---|---|
| specific gravity | stand. condition (20° C.) | | 1.353 | 1.351 |
| | 35° C., 80% RH | | 1.349 | 1.317 |
| | ratio of change (%) | | −0.3 | −2.5 |
| | do., 1% water added | | 1.342 | 1.092 |
| | ratio of change (%) | | −0.8 | −19.2 |
| properties of cured coating film | reference | hardness | 50 | 46 |
| | | elongation at break (%) | 820 | 750 |
| | | tensile strength (kgf/cm$^2$) | 51 | 39 |
| | 35° C. 80% RH | hardness | 47 | 44 |
| | | elongation at break (%) | 800 | 700 |
| | | tensile strength (kgf/cm$^2$) | 48.5 | 29.3 |
| | | retention of tensile strength (%) | 95 | 75 |
| | do., 1% water added | hardness | 45 | 30 |
| | | elongation at break (%) | 810 | 800 |
| | | tensile strength (kgf/cm$^2$) | 43.4 | 21.1 |
| | | retention of tensile strength (%) | 85 | 54 |

EXAMPLE 17

(water resistance test)

Each coating film test piece cured under the standard conditions (20° C. for 7 days) was immersed in hot water at 70° C. for a month and thereafter its tensile properties were tested in order to estimate the long-term water resistance of the coating film.

For comparison, the test was conducted with respect to the two recipes, one according to the process of the present invention and the other according to the prior art process based on MOCA-polyol crosslinking. The same recipes as in Example 16 were employed. The results are as given in Table 7.

The results showed that the coating film according to the present invention retained 80% of the tensile strength and exhibited little deterioration in both the hardness and elongation despite the conditions as pretty severe as 70° C. for 1 month, thereby suggesting the capability of retaining the waterproofing performance over an appreciably prolonged period of time. By contrast, the coating film according to the prior art process had a tensile strength retention lowered to 35% and further considerable deteriorations relative to the initial properties were found in both its hardness and elongation.

TABLE 7

|  |  | Invention | Prior art |
|---|---|---|---|
| reference properties | hardness | 50 | 46 |
|  | elongation at break (%) | 820 | 750 |
|  | tensile strength (kgf/cm$^2$) | 51 | 39 |
| immersed at 70° C. for 1 month | hardness | 45 | 23 |
|  | elongation at break (%) | 820 | 420 |
|  | tensile strength (kgf/cm$^2$) | 41 | 13.7 |
|  | retention of tensile strength (%) | 80 | 35 |

INDUSTRIAL APPLICABILITY

As apparent from the foregoing description, according to the present invention, it is possible to obtain a finely finished cured polyurethane film excellent in heat and water resistances without causing foaming and leaving surface tack a few hours after the application with a desired pot life retained, by in-situ mixing a base composed mainly of an isocyanate-terminated prepolymer obtained by the reaction between TDI and a polyoxypropylene polyol and/or a polyoxyethylenepropylene polyol with a curing agent containing an aromatic polyamine cross-linker composed mainly of DETDA and a given amount of a plasticizer in such proportions that the equivalent ratio of the NCO groups of the base to the NH$_2$ groups of DETDA of the curing agent falls in a given range, followed by coating and curing. Therefore, the process of the present invention can be effectively applied to hand coating of a rapidly curable coating waterproofer and floor coating material.

We claim:

1. A process for producing a rapidly curable cold-setting polyurethane coating waterproofer retaining a required pot life by mixing a base whose principal component is an isocyanate-terminated prepolymer obtained by reacting tolylene diisocyanate with a polyol with a curing agent containing an aromatic polyamine crosslinker and a plasticizer, followed by coating and curing, which comprises:

(a) using a polyoxypropylene polyol and/or a polyoxyethylenepropylene polyol as the principal component of the polyol to be reacted with tolylene diisocyanate, (b) using diethyltoluenediamine as the principal component of the aromatic polyamine crosslinker contained in the curing agent, (C) using the plasticizer contained in the curing agent in an amount of 20 to 130 parts by weight per 100 parts by weight of the isocyanate-terminated prepolymer, and (d) in-situ mixing the base with the curing agent in such proportions that the equivalent ratio of the isocyanate groups of the prepolymer contained in the base to the amino groups of the aromatic polyamine contained in the curing agent ranges from 0.8 to 2.0, followed by coating and curing.

2. The process for producing a rapidly curable cold-setting polyurethane coating waterproofer according to claim 1, wherein the isocyanate-terminated prepolymer has an isocyanate group content of 1.5 to 5.0% by weight.

3. The process for producing a rapidly curable cold-setting polyurethane coating waterproofer according to claim 1, wherein the tolylene diisocyanate is one containing the 2,4-isomer in an amount of at least 80% by weight.

4. The process for producing a rapidly curable cold-setting polyurethane coating waterproofer according to claim 1, wherein the tolylene diisocyanate is one containing the 2,4-isomer in an amount of at least 85% by weight.

5. The process for producing a rapidly curable cold-setting polyurethane coating waterproofer according to claim 1, comprising in-situ mixing the base with the curing agent in such proportions that the equivalent ratio of the isocyanate groups of the prepolymer contained in the base to the amino groups of the aromatic polyamine contained in the curing agent ranges from 0.8 to 1.7, followed by coating and curing.

6. The process for producing a rapidly curable cold-setting polyurethane coating waterproofer according to claim 1, wherein the pot life ranges from 15 min to 120 min both inclusive.

7. The process for producing a rapidly curable cold-setting polyurethane coating waterproofer according to claim 1, wherein the polyurethane coating waterproofer has a hardness (JIS hardness A) ranging from 30 to 75.

* * * * *